United States Patent
Tarantino et al.

[11] 3,743,201
[45] July 3, 1973

[54] CASSETTE FOR STRIP CHART RECORDERS

[76] Inventors: Rocco J. Tarantino, 265 Sandpiper Drive, Palm Beach, Fla.; John O. Yeiser, 24961 Cienega Lane, Mission Viejo, Calif. 92675

[22] Filed: June 9, 1971

[21] Appl. No.: 151,344

[52] U.S. Cl. ................................. 242/67.3, 346/146
[51] Int. Cl. .................................................. B65h 17/02
[58] Field of Search ........................ 242/67.3, 67.1 R, 242/67.2, 71.2, 71.1; 346/146

[56] References Cited
UNITED STATES PATENTS
| | | | |
|---|---|---|---|
| 2,924,499 | 2/1960 | Young | 242/71.1 X |
| 3,281,090 | 10/1966 | Baranowski | 242/67.3 R |
| 2,671,710 | 3/1954 | Bowditch | 242/67.2 X |

*Primary Examiner*—Stanley N. Gilreath
*Assistant Examiner*—Edward J. McCarthy
*Attorney*—Lawrence Fleming

[57] ABSTRACT

A low-cost chart paper cassette for strip-chart recording instruments. Analogously to film and tape cassettes, the chart cassette contains a roll of chart paper and a takeup spool, and is attachable to a chart recording instrument built to fit it. The box-like housing of the cassette may be made of two havles molded of plastic material, cemented together. The chart paper moves forward across the top of the cassette under the recording stylus, down the front of the cassette, and back inside onto the takeup spool. The chart paper is moved by sprockets which are part of the recording instrument and intrude into the front of the cassette when it is in place. The takeup spool shaft protrudes from the side of the cassette and carries a gear which meshes with a gear on the instrument. The supply spool shaft may also protrude. When a knob is attached to this shaft, a detached cassette may operate as a chart viewer. For monitoring long records, the paper may be cut externally of the cassette, and allowed to hang down outside. For compact storage of records, the roll may be removed from the cassette. The cassette has a groove, along which it may be separated or broken apart, the portion containing the takeup spool and record being retained for storage.

9 Claims, 6 Drawing Figures

Patented July 3, 1973 3,743,201
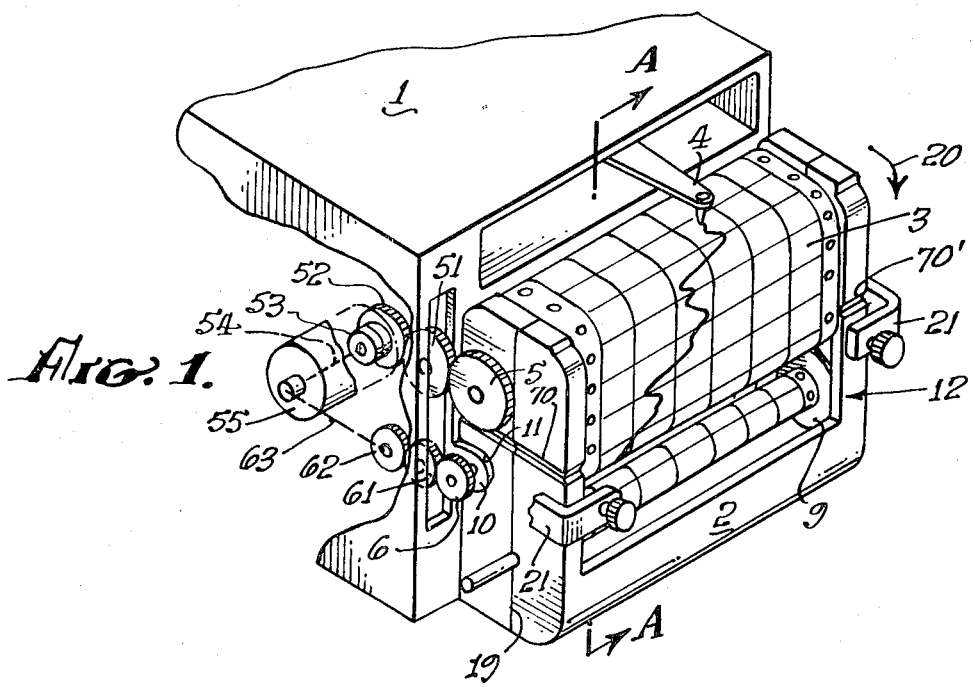
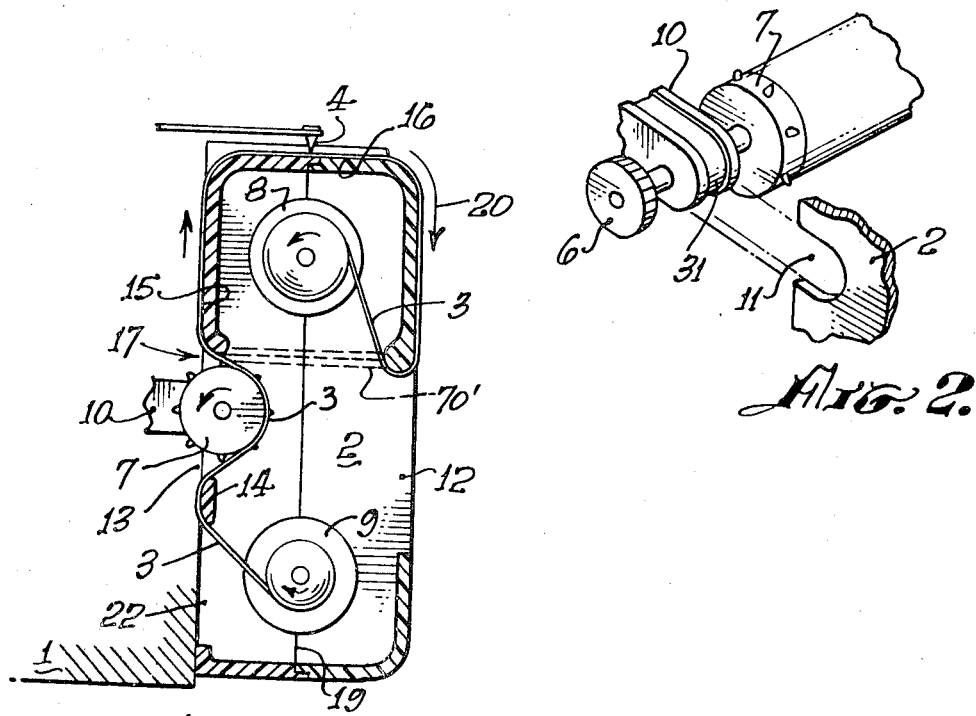
INVENTORS.
ROCCO J. TARANTINO,
JOHN O. YEISER,
By Lawrence Fleming
AGENT

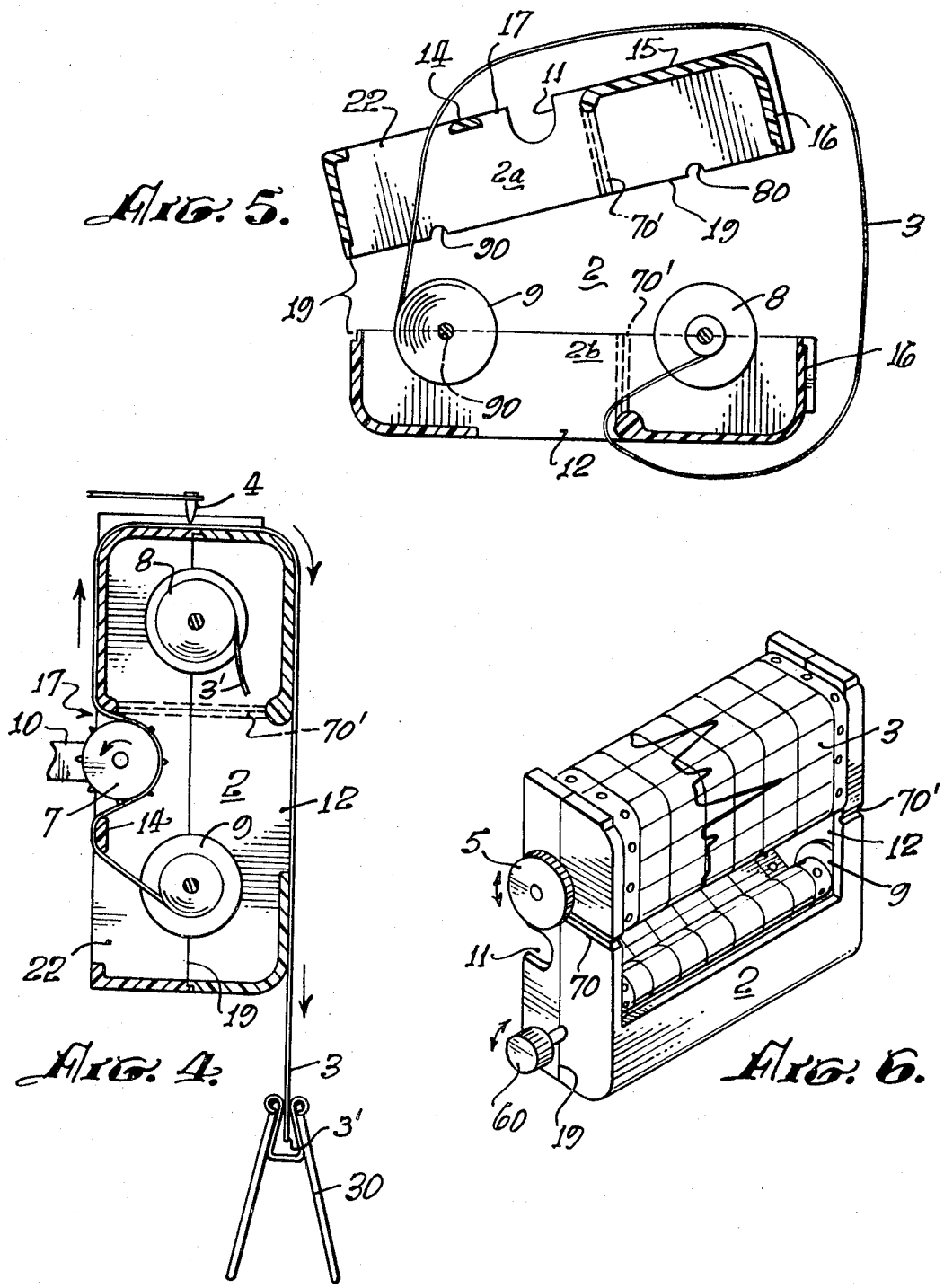

CASSETTE FOR STRIP CHART RECORDERS

BACKGROUND

This invention relates to strip-chart recording instruments, such as are widely used to record temperature, pressure, voltage, and many other measurands as a function of time, in laboratories and industrial plants. Loading and unloading chart paper in such instruments may be relatively complicated and inconvenient. Viewing selected portions of a long chart record may also be relatively awkward, and normally requires a separate piece of apparatus.

Removable chart assemblies or modules are known in the art of graphic recording instruments and oscillographs. These, however, are permanent machine subassemblies containing relatively costly parts such as sprockets or even drive motors, and are designed to be removed and reloaded with spools of chart paper or oscillograph film or paper. A few such subassemblies, at most, may be kept on hand by the user of a particular instrument. The prior art does not appear to contemplate a chart paper cassette which performs the major functions of such subassemblies, as well as some other functions, and also is very economical to manufacture, so that it may be sold integrally with a spool of chart paper in the same fashion that magnetic tape cassettes are sold with a roll of tape inside.

BRIEF SUMMARY

This invention is a chart paper cassette, analogous to the disposable cassettes used in photography and in tape recording, the film or tape being normally sold in and with the cassette. This chart cassette contains a roll of chart paper and a takeup spool, and is intended to be sold with a spool of chart paper inside. In operation, the paper moves from the supply roll or spool through a slot to the exterior of the cassette, across a recording table-like surface thereon located under the stylus, then back inside onto the takeup spool. The chart drive sprockets are mounted on the recording instrument itself, but intrude into the cassette through a wide slot and engage the sprocket holes on the paper when the cassette is mounted on the instrument. The takeup spool shaft may protrude outside the cassette. A gear or the like may be mounted on this shaft, and engage a takeup drive gear or the like on the recording instrument when the cassette is mounted in place. This drive gear is driven by suitable mechanism inside the instrument so as to maintain tension in the chart paper, as by a slip clutch or a torque motor.

The supply spool shaft on the cassette may also protrude, and a knob may be attached to it. When the cassette is removed from the recorder, it may be used as a chart viewer, rolling the chart back and forth by manually turning either the takeup shaft gear or the supply spool knob.

If the operator wants to watch a relatively long length of chart while it is being recorded, he may cut the chart before it re-enters the cassette (en route to the takeup spool) and let it hang down outside. Tension may be maintained by hanging a weight on the depending cut end of the chart.

The cassette may be made of cheap plastic material molded in two halves. It is not intended normally to be re-used; but may be opened and the recorded chart spool removed for storage. There is also provided a groove or the like 70 or 70' on the cassette case adjacent the portion which houses the takeup spool. When this spool is full, the body or case may be broken apart along the groove and the takeup spool portion stored with its chart record. The remainder of the cassette may then be discarded.

IN THE DRAWING

FIG. 1 is a partial cutaway isometric vies of a cassette attached to a chart recording instrument according to the invention;

FIG. 2 is an isometric detail view of a portion of the chart drive sprocket mechanism and a mating portion of a cassette;

FIG. 3 is a cross-sectional view of a chart cassette taken along line A—A of FIG. 1;

FIG. 4 is a cross-sectional view similar to FIG. 3, but showing the paper chart cut and hanging down outside the cassette;

FIG. 5 is a cross-sectional view of a cassette disassembled, to show how it is loaded; and FIG. 6 is an isometric view of a cassette illustrating its use as a chart viewer.

DETAILED DESCRIPTION

FIG. 1 shows a cassette 2 mounted on a chart recorder 1 according to the invention. It is detachably mounted on the recording instrument 1 by clamps 21 or any other suitable means, and its location may be fixed by the engagement of a bearing mount 10 with a cutout 11 (shown best in FIG. 2). In FIG. 1, the chart 3 moves forward over the top of the cassette case under the recording pen or stylus 4, down along the back of the cassette 2, and into a back slot 12. Arrow 20 shows the direction of motion.

A gear or the like 5, FIG. 1, turns the takeup spool inside the cassette. It may be driven in turn by a gear 52 through an intermediate gear 51 in the recorder 1. The gear 52 may in turn be driven from the motor 55 by any suitable means indicated by dotted line 54, and a slipping clutch indicated at 53, in order to maintain suitable tension on the chart paper. Other known takeup drive means may be used, such as a torque motor or a slipping belt. If a slipping belt is used, gear 5 would be replaced by a pulley, as is obvious.

The controlled advance of the chart is effected by sprockets 7 (not visible in FIG. 1; see FIGS. 2–4) whose shaft may hang in bearings in a mount 10, FIGS. 1 and 2. This shaft may be turned at a known rate by any suitable means. Shown in FIG. 1 for this purpose is a gear train 6, 61, 62, driven from motor 55 by an appropriate means indicated by dotted line 63. Shaft mount 10, gear or the like 6, and the chart drive sprocket 7 are all permanent parts of the recorder 1. At the right-hand end of recorder 1 is, obviously, another shaft mount 10 for the other end of the sprocket shaft, not visible.

FIG. 2 is a detail showing how the cassette may be fixed in position with respect to the recorder 1, and also showing a sprocket 7. Bearing mount 10 for the shaft of sprocket 7, which is part of the recorder 1, may have a groove 31 around it. The cutout 11 in the wall of the cassette 2 (FIGS. 1 and 2) may fit around this groove. This is the preferred arrangement for cassette locating; but other known means may be used, such as conventional locating pins and the like.

FIG. 3 is a cross-sectional view of a cassette according to the invention, showing the sprocket 7 as well as its shaft mount 10, with sprocket 7 engaging the perforations in the chart 3. It will be evident that in a cassette that is not attached to a recorder such as 1, the sprocket 7 will not be present (see FIG. 5). In FIG. 3, the chart supply spool is indicated at 9. From here, the chart 3 goes around a bar 14 (which may be molded as an integral part of the cassette 2), and around the sprocket 7. Thence it moves up the outer front surface 15 of the cassette 2, over its top surface 16 under the pen or stylus 4, then down the back and into the back slot 12. After going in the back slot 12, the paper chart passes onto the takeup spool 8. The shaft of this takeup spool is subjected to a torque, as by gears 5, 51, 52, and slip clutch 53, FIG. 1, as described above. The torque serves to keep the chart under tension so that its perforations engage with the sprocket 7, and also serves to keep the paper flat under the stylus 4, in known manner. Directions of rotation and motion are indicated by arrows.

It will be seen that the sprocket 7 intrudes substantially into the interior of the cassette through the slot 17, so that the chart 3 can wrap around a suitable fraction of its circumference.

FIG. 4 is a view similar to FIG. 3, but showing the paper chart 3 cut off at 3', the exiting part of the chart 3, after recording, hanging down outside the cassette to permit inspection of a greater length at a time. A weight 30 may be attached to the depending end of the chart to maintain the tension. Other obvious expedients may be employed to maintain the tension externally, such as an external spool with a torque motor.

FIG. 5 shows a cassette in section disassembled, to illustrate how it goes together. It may be made in two halves 2a, 2b, which fit together along line 19. Line or seam 19 is also shown in FIGS. 1, 3 and 4. The shafts of spools 8 and 9 may fit into cutouts 80, 90 in these halves which, when fitted together, provide their bearings. In assembling a cassette, chart roll 9 and takeup roll 8 may be laid in place as shown, and the chart 3 then fed through slot 22, around the case-halves 2a, 2b, in through slot 12, and onto takeup spool 8. The two case-halves 2a, 2b may then be put together and glued or otherwise fastened together, and the slack in the chart taken up by turning the shaft of roll or spool 9.

Alternatively in FIG. 5, the beginning (takeup) end of the chart 3 may be glued or taped onto takeup spool 8 before assembly is started. Supply spool 9 may then be dropped into place first, and takeup spool 8, carrying the end of chart 3, passed through slot 22, around the case-half 2a, and in through the back slot 12 in case-half 2b. Slots 12 and 22 are made wide enough to pass the spool 8. As the last steps, the spool 8 may be dropped into place in the position shown in FIG. 5, and the two case halves 2a, 2b attached together.

FIG. 6 shows a cassette 2 similar to that in FIG. 1 but detached from the recorder and having a knob 60 put on the supply roll shaft. It will be seen that the chart 3 can be wound back and forth by turning knob 60 and gear 5, for viewing any portion of the record. The invention contemplates a cassette holding from 50 to 100 feet of chart paper.

Guide fingers or other such elements, of various known types, not shown, may be made part of cassette 2 to assist in guiding or holding down the chart, as may be needed.

Grooves or the like 70, 70' FIGS. 1, 3, and 4–6, is provided to permit breaking or separating the case or body of cassette 2 into parts to facilitate storage of the chart record on takeup spool 8. The cassette may be broken apart along the line 70, 70', and the lower portion containing supply spool 9 (now presumably empty) discarded. The upper portion containing the chart on takeup spool 8 may then be stored or shipped, taking up less space than a whole cassette, while this upper portion of the cassette case serves as a protective package with convenient surfaces for labeling.

We claim:

1. A low-cost cassette for a strip chart recording instrument having a chart marking element comprising:
   a case attachable to said instrument,
   a chart supply spool and a chart takeup spool in said case,
   a first opening in said case, said chart passing from said supply spool out said opening to lie along an outer surface of said case,
   a portion of said surface being disposed as a writing surface for said marking element, and
   a second opening in said case, said chart passing back into said opening to said takeup spool,
   said cassette being adapted to the intrusion of a chart driving element on said instrument to engage said chart and move it at a predetermined rate.

2. A cassette as in claim 1, further comprising:
   an external generally circular element rotatably connected to said takeup spool and adapted to engage torque-producing means on said instrument.

3. A cassette as in claim 1, further comprising:
   recessed portions in said case adapted to fit accurately around a shaft carrying said chart driving element.

4. A cassette as in claim 1, further comprising:
   recessed portions in said case adapted to fit closely around shaft bearing supports for said chart driving element to locate said cassette accurately with respect to said instrument.

5. A cassette as in claim 1, wherein said chart has sprocket perforations and said chart driving element comprises a sprocket engageable therewith.

6. A cassette as in claim 2, further comprising:
   a knob-like element rotatably connected to said supply spool,
   whereby said chart may be moved back and forth by turning said knoblike element and said circular driven element to view selected portions of said chart.

7. A cassette as in claim 1, wherein:
   said supply spool and takeup spool are mounted on shafts supported in the sides of said case, and
   said case is made in two halves attached together at a joining line,
   said line passing substantially through the center lines of said shafts.

8. A cassette as in claim 1, further comprising:
   a line-like separation belt extending around said case between the portion containing said supply spool and the portion containing said takeup spool,
   whereby said portions may be separated and the portion containing said takeup spool used as a storage container for the chart on said spool and the remaining portion discarded.

9. In combination, a strip chart recording instrument having a chart-marking element, a chart drive sprocket assembly, and a torque driving element all protruding therefrom, and a chart cassette attachable thereto, said cassette comprising:

an opening to receive portions of said sprocket assembly to drive said chart,
a takeup spool rotatably connected to a drivable element adapted to engage said torque driving element,
a supply spool containing a pooled chart and
a first and a second slot, said chart exiting through said first slot to the exterior surface of said cassette, passing over said exterior surface under said chart marking element, and re-entering said cassette through said second slot and passing onto said takeup spool.

* * * * *